(12) United States Patent
Gromoll et al.

(10) Patent No.: US 7,102,267 B2
(45) Date of Patent: Sep. 5, 2006

(54) ELECTRIC MACHINE WITH THERMOSIPHON-TYPE COOLING SYSTEM

(75) Inventors: Bernd Gromoll, Baiersdorf (DE); Michael Handwerker, Bischofsheim (DE); Olaf Krieg, Bad Neustadt (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/088,233

(22) Filed: Mar. 23, 2005

(65) Prior Publication Data

US 2005/0194847 A1 Sep. 8, 2005

Related U.S. Application Data

(63) Continuation of application No. PCT/DE03/03014, filed on Sep. 11, 2003.

(30) Foreign Application Priority Data

Sep. 24, 2002 (DE) ................ 102 44 428

(51) Int. Cl.
*H02K 3/46* (2006.01)
(52) U.S. Cl. .................... 310/260; 310/52; 310/58; 310/64
(58) Field of Classification Search ............ 310/52–64, 310/260
See application file for complete search history.

(56) References Cited

U.S. PATENT DOCUMENTS

| 1,700,840 A | | 2/1929 | Gay ............................ 310/52 |
| 2,844,745 A | * | 7/1958 | Hamm ....................... 310/57 |
| 2,909,682 A | * | 10/1959 | Erickson ..................... 310/64 |
| 3,715,610 A | | 2/1973 | Brinkmann .................. 310/54 |
| 3,801,843 A | | 4/1974 | Corman et al. .............. 310/52 |
| 3,906,261 A | * | 9/1975 | Ogura et al. ................ 310/12 |
| 4,295,067 A | | 10/1981 | Binder et al. ............... 310/52 |
| 5,455,480 A | | 10/1995 | Bastian et al. .............. 313/285 |
| 5,947,111 A | | 9/1999 | Neulander et al. .......... 126/351 |
| 2001/0000201 A1 | | 4/2001 | Osakabe et al. ............. 310/52 |

FOREIGN PATENT DOCUMENTS

| DE | 2 310 704 A | 9/1973 |
| DE | 28 10 222 A1 | 9/1979 |
| DE | 29 51 859 | 3/1981 |

(Continued)

OTHER PUBLICATIONS

Proceedings of the American Power Conference, vol. 39, Chicago 1977, Illinois Institute of Technology, pp. 255 to 269.

(Continued)

*Primary Examiner*—Dang D. Le
(74) *Attorney, Agent, or Firm*—Henry M. Feiereisen

(57) ABSTRACT

An electric machine includes a housing for accommodating a rotatably supported rotor and a stationary stator, and a cooling device for cooling heat-generating components of the rotor and the stator. The cooling device includes a closed-flow system having an evaporator disposed in the housing, a condenser disposed outside the housing at a geodetically higher location, and a closed tube assembly, which connects the condenser and the evaporator, for circulating a coolant using a thermosiphon effect as a result of a difference in density between vapor and liquid portions of the coolant. The closed-flow system contains a liquid-vapor mixture of the coolant in a saturated state and includes a first tube for conducting coolant to the evaporator and a second tube for conducting coolant away from the evaporator. The first tube has hereby a cross section which is smaller than a cross section of the second tube.

15 Claims, 7 Drawing Sheets

FOREIGN PATENT DOCUMENTS

| | | |
|---|---|---|
| DE | 41 08 981 C2 | 10/1992 |
| DE | 42 42 132 A1 | 6/1994 |
| DE | 197 49 108 C | 4/1999 |
| DE | 100 18 169 A1 | 10/2001 |
| EP | 0 823 370 A1 | 2/1998 |
| GB | 1 583 857 | 2/1981 |
| JP | 5-207704 * | 8/1993 |

OTHER PUBLICATIONS

Drive and Control, No. 1, 1992, pp. 10 to 12.
W. Markert: "Einsatz von Wärmerohren zur Kühlung elektrischer Maschinen", in Elektrie 36, issue 1, 1982, pp. 30-32.

* cited by examiner

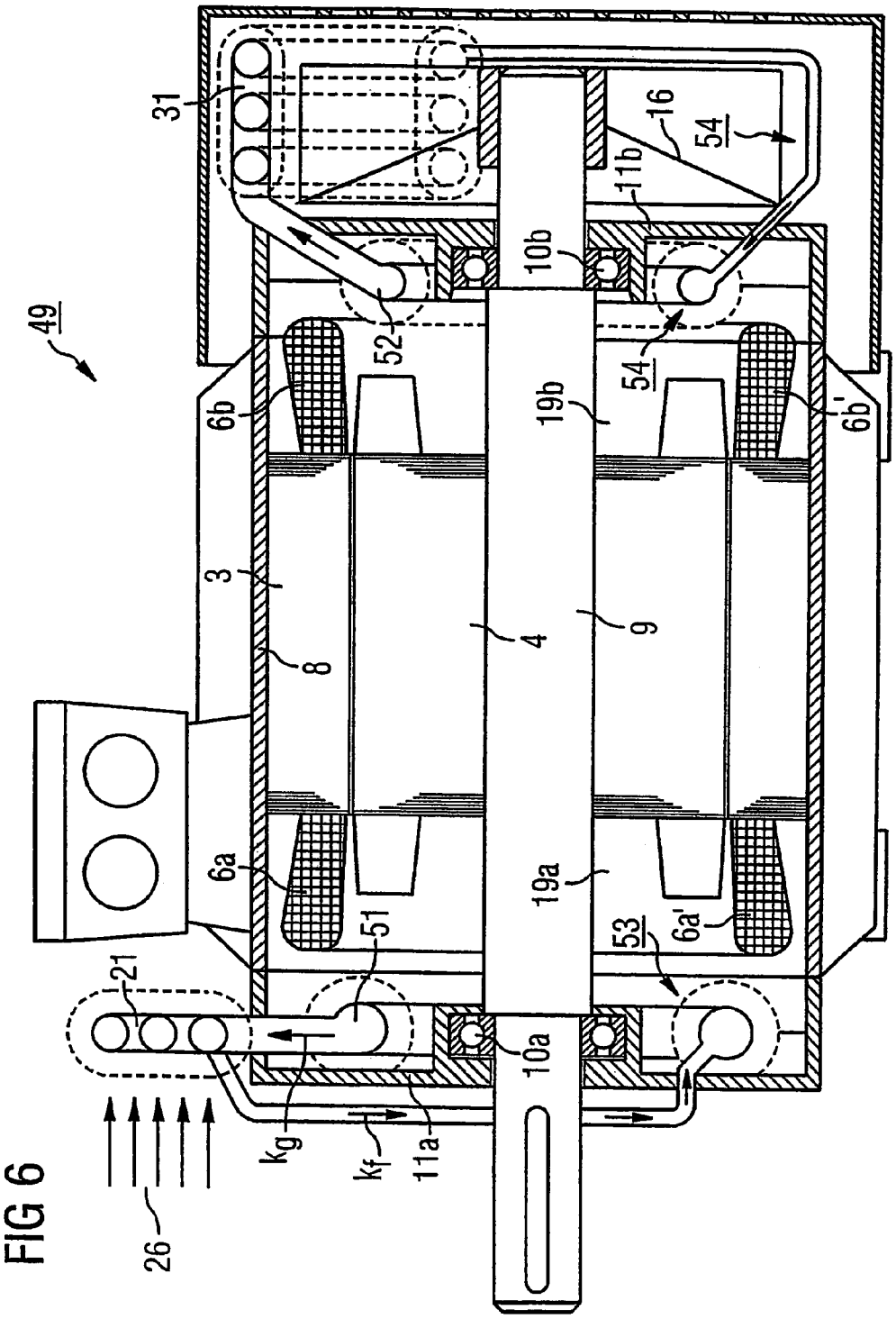

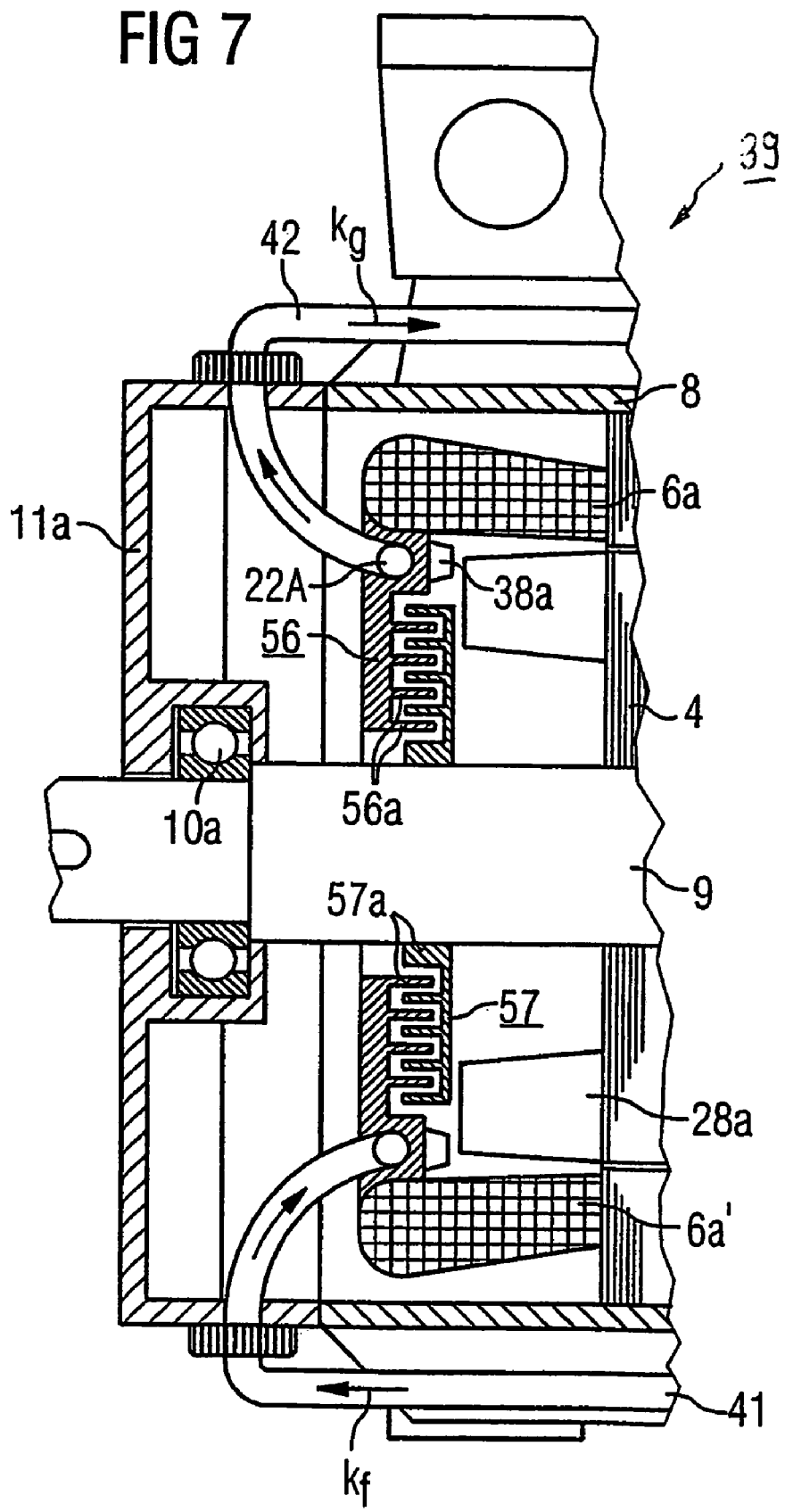

ELECTRIC MACHINE WITH THERMOSIPHON-TYPE COOLING SYSTEM

CROSS-REFERENCES TO RELATED APPLICATIONS

This application is a continuation of prior filed copending PCT International application no. PCT/DE2003/003014, filed Sep. 11, 2003, which designated the United States and on which priority is claimed under 35 U.S.C. §120 and which claims the priority of German Patent Application, Serial No. 102 44 428.5, filed Sep. 24, 2002, pursuant to 35 U.S.C. 119(a)–(d).

BACKGROUND OF THE INVENTION

The present invention relates, in general, to the field of electric machines.

Nothing in the following discussion of the state of the art is to be construed as an admission of prior art.

German patent publication no. DE 42 42 132 A1 describes an electric machine having a housing for accommodation of a rotor, which is constructed in the form of a laminated rotor core and includes a rotor shaft, and a stator. Placed inside the housing is a fan, which is arranged on both ends of the rotor shaft. Cooling channels extend in the rotor core along the entire axial length thereof and convey coolant for cooling components of the electric machine inside the housing.

Electric machines of all power outputs, especially those of higher output, develop significant amounts of heat which must be removed to attain a more efficient operation and service life. Larger electric machines, such as, e.g., generators, may be equipped, for example, with a cooling device using $H_2$ gas for cooling the stator and the rotor, as described, e.g., in the publication entitled "Proceedings of the American Power Conference", Vol. 39, Chicago 1977, pages 255 to 269. $H_2$ gas is hereby circulated in an encapsulated housing. This approach not only requires complicated sealing measures but also demands considerable safety measures.

Another approach involves the application of water-cooled generators which use circulation of water in channels that extend predominantly through the stator bars or stator cores. The provision of pumps is required however to effectuate the water circulation, and water needs to be conditioned to provide corrosion protection.

Air-cooled machines, such as motors, especially with an output under 300 MVA, are known to realize a cooling action by applying a comparably large air flow. This air flow is hereby conducted through a network of fine channels. Examples include the afore-mentioned German patent publication no. DE 42 42 132 A1 or European Pat. No. EP 0 823 370 A1. A shortcoming associated with this approach is generation of unwanted heat by the air stream itself as a result of friction losses.

Enclosed machines, which lack incoming coolant from outside to flow through the electrically active component of the machine, use external ventilation. This approach leads, however, to an uneven temperature profile in the motor, as has been described in the magazine "Drive and Control, number 1, 1992, pages 10 to 12. While the bearing and end winding of the stator winding on the non-driving side of the electric machine are normally subjected to temperatures below their thermal limits, the driving side, on the other hand, encounters higher temperatures which subject the bearing and end winding of the stator winding on this driving side to greater stress, ultimately causing harm to the electric machine. To address this problem, it has been proposed to balance the difference in temperature between both sides by an additional air flow to attain a better cooling action. One such approach is disclosed in German patent publication no. DE 29 51 859 C2, and involves the use of external ventilation of the machine housing. The exterior of the housing is hereby formed with cooling fins for passage of an axial air stream which is generated by a fan operated by the shaft at the end zone of the non-driving side. While heat may be transferred from the laminated stator core to the immediately adjacent surrounding outer housing, this approach is insufficient to remove enough heat from the area of the end windings which project out from the stator core at the ends thereof. Thus, there is oftentimes the need for providing a particular channel system for air cooling inside the machine housing in order to cool the rotor and the end windings. One example of this proposal is the afore-mentioned German patent publication no. DE 42 42 132 A1.

Heat produced by the rotor also leads to losses and can be removed partly by heat conduction via the surrounding air gap to the stator and ultimately from the stator to the outer machine housing, which may be connected to the stator, and to an air flow that cools the housing. The air gap represents, however, a significant heat barrier. Another part of the heat-based rotor losses is conducted to the outside via the motor shaft and thus heats up the shaft bearings. As a result, the service life of the bearing is adversely affected because the average bearing temperature and temperature differential between the typical ring-shaped bearing inner and outer parts is too high.

A major portion of these losses, in particular the area of the end windings projecting on both sides of the stator into the housing interior, can however only be transferred through convection onto the end surfaces of the machine housing. The convection can be improved by providing the end surface of the rotor with knobs or wings to cause an undefined turbulence of the air stream inside the housing. This requires however measures to prevent the end surfaces of the housing from being exposed to excessive heat because the shaft bearings at these zones cannot be subjected to temperatures beyond a set maximum value.

It would be desirable and advantageous to provide an improved electric machine to obviate prior art shortcomings and to attain a cooling action in a simple and yet reliable manner especially in the area of the end windings.

SUMMARY OF THE INVENTION

According to one aspect of the present invention, an electric machine includes a housing, a rotatably supported rotor and a stationary stator which interact with one another and are disposed in the housing, and a cooling device for cooling heat-generating components of the rotor and the stator, wherein the cooling device includes a closed-flow system having an evaporator disposed in the housing, a condenser disposed outside the housing at a geodetically higher level, and a closed tube assembly, which connects the condenser and the evaporator, for circulating a coolant by thermosiphon as a result of a difference in density between vapor and liquid portions of the coolant, with the closed-flow system containing a liquid-vapor mixture of the coolant in a saturated state, wherein the tube assembly includes a first tube for feeding coolant to the evaporator, and a second tube for conducting coolant away from the evaporator, with the first tube having a cross section which is smaller than a cross section of the second tube.

The present invention resolves prior art problems by using circulation of a coolant as a result of natural thermosiphon in a closed tube assembly which extends at a gradient between a heat sink forming cold zone of the cooling device and the machine components to be cooled, especially the components at an axial end of the electric machine such as an end winding of the stator winding. In general, a thermosiphon absorbs heat by vaporizing liquid on a boiling surface and transferring the vapor to a condenser where it cools and reliquefies. Gravity then returns the liquid to the evaporator to repeat the cycle. Coolant in this circuit thus (re-)liquefies in the cold zone, representing the condenser zone, and flows from there to the area of the machine components to be cooled, representing the evaporation zone, where the coolant absorbs the loss heat and is normally evaporated. Evaporated coolant flows back in the closed-flow system to the condenser zone. This natural circulation of the coolant by thermosiphon thus takes place as a result of the difference in temperature in the coolant in the condenser and evaporation zones. The closed-flow system can be filled with any commercially available coolant. The liquid-vapor mixture in the coolant is saturated. In other words, the pressure in the closed-flow system is determined by the lowest temperature which the tube assembly is subjected to, i.e. the temperature at which the absorbed heat is removed by the condenser. When the heat losses of the electric machine are transferred to the evaporator, the coolant evaporates instantaneously as the coolant is in the boiling state. Prerequisite is hereby that the condenser is at a lower temperature level than the evaporator. This triggers a circulation which is maintained solely by gravity in view of the difference in density between vapor and liquid of the coolant. It is only necessary to place the condenser above or at least at level with the evaporator.

The provision of a closed-flow system using the natural thermosiphon effect in which the inner heat transport of a coolant ensures a highly efficient heat conduction during phase transitions, loss heat can be removed practically directly from the involved heat source inside the machine housing to the outside, e.g. to cooling air or another heat sink such as, e.g., water, or sea water in the event of a ship's motor. There is no need to overcome relevant thermal heat barriers such as housing walls or air gaps. In addition, thermal stress on other machine components such as, e.g., bearings, is decreased. The thermosiphon effect of the cooling device is implemented in the absence of any moving parts and thus can be constructed maintenance-free and self-regulating.

Compared to purely air-cooled machines, the direct heat removal at the source of the heat losses by establishing natural thermosiphon allows a reduction in the air volume flow. As a consequence, the air stream generates less heat, further contributing to a reduction of the air volume. Compared to a conventional electric machine of same power output, an electric machine according to the present invention operates more efficient and is cost-saving as far as production is concerned, in particular as it related to the winding and the laminated stator core. Moreover, the reduction of the air volume flow also lessens noise development.

According to another feature of the present invention, the housing has opposite end surfaces, wherein the closed-flow system may be disposed at one of the axial ends, whereas a second such closed-flow system is disposed at the other one of the axial ends of the electric machine. In this way, the evaporators of both closed-flow systems are able to effect a substantially even cooling action especially in the area of the end windings of the stator winding parts and/or shaft bearings.

As an alternative, a common closed-flow system may be provided to have two evaporators, with one of the evaporators disposed at one axial end, and the other one of the evaporators disposed at the other axial end. This type of common closed-flow system using thermosiphon is characterized by a reduced number of parts.

According to another feature of the present invention, the evaporator and/or condenser may be constructed with surface-enlarging structures for increasing a heat transfer. In this way, a good heat transfer can take place by convection at the evaporator. Examples of surface-enlarging structures include configuration of the condenser in the form of a cooling coil, and/or construction of the condenser with cooling fins, or construction of the evaporator with cooling fins.

According to another feature of the present invention, the evaporator may be constructed in heat-conducting connection with at least one of the end windings. Thus, heat generated by the end winding can be directly removed by the thermosiphon effect in the closed-flow system without inadmissible heating of other machine components, such as the associated bearing.

According to another feature of the present invention, the housing may have opposite end plates, with the evaporator being constructed for heat-conducting connection with at least one of the end plates. Suitably, the evaporator may be integrated in the one end plate. As the end plate is normally in heat-conducting connection with a bearing, inadmissible heating of the bearing can thus easily be prevented.

According to another feature of the present invention, the cooling device may be constructed to have an additional flow path system for air cooling. The flow path system may hereby include a fan which is disposed on one end of the housing for generating an air stream in a flow channel at an outer marginal area of the housing. In addition to self-ventilation by the machine, the provision of external ventilation may certainly be possible as well. Suitably, the condenser of the thermosiphon may be disposed in the air stream.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 is a sectional view of a fifth embodiment of an electric machine according to the present invention; and FIG. 7 is a cutaway view, on an enlarged scale, of a modification of the electric machine of FIG. 4.

DETAILED DESCRIPTION OF PREFERRED EMBODIMENTS

Figure 1:
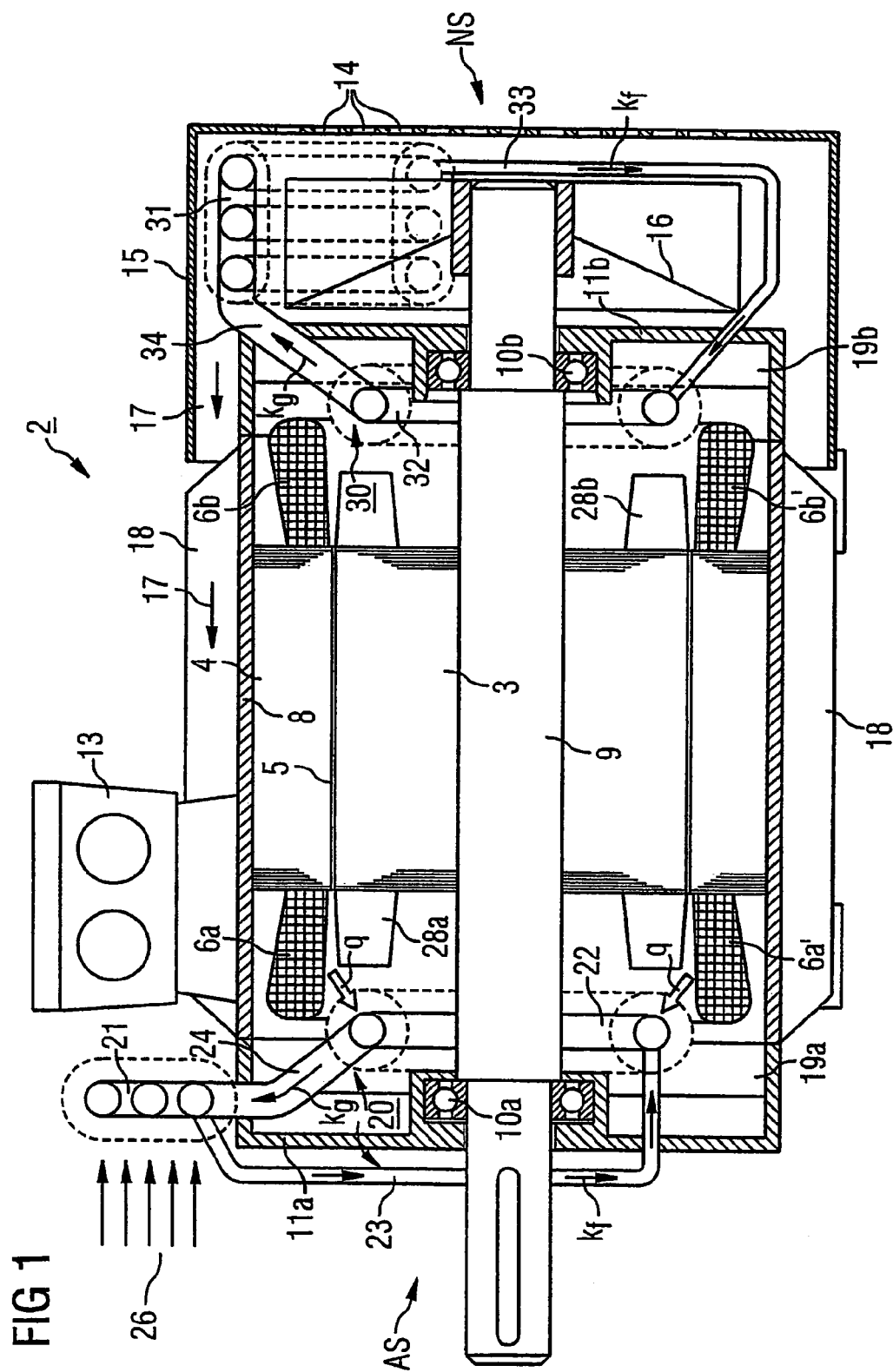
FIG. 1 is a sectional view of a first embodiment of an electric machine according to the present invention.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In general, the present invention is directed to an electric machine having average or higher power output, such as, e.g., generator or low-voltage motors. For the sake of simplicity, the electric machine according to the invention will be described hereinafter only in connection with those parts that are necessary for the understanding of the present invention. It will be appreciated by persons skilled in the art that the electric machine shown in the drawing contains additional components which are standard in motors involved here and are commercially available by Siemens AG, Germany, e.g. a two-pole or four-pole low-voltage motor, commercially available under the designation 1LA5 183. However, these additional components are not part of the invention and thus do not appear in the foregoing Figures.

Turning now to the drawing, and in particular to FIG. 1, there is shown a sectional view of a first embodiment of an electric machine according to the present invention; generally designated by reference numeral 2 and having a rotor core 3 formed of a plurality of stacked laminations, and a stator core 4 formed of a plurality of stacked laminations in distanced surrounding relationship to the rotor core 3 to define a narrow air gap 5 therebetween. The stator core 4 includes a stator winding which terminates in two end windings 6a, 6a' and 6b, 6b' at the axial ends of the stator core 4. In the non-limiting example of FIG. 1, each side includes a single-part or multi-part end winding whose lower portion is situated at a colder environment and is distinguished here by a prime. Immediately adjacent to the stator core 4 in surrounding relationship thereto is a motor housing 8 which is traversed by a rotor shaft 9 having opposite axial ends supported by respective bearings 10a, 10b. The housing 8 is closed on opposite axial ends by end plates 11a, 11b to thereby define inner housing spaces 19a, 19b in an area adjacent to the end plates 11a, 11b. Attached to an outside wall of the housing 8 is a connection box 12 for electric terminals of the stator winding. Reference character AS designates the driving side of the electric machine 2, whereas reference character NS designates the non-driving side of the electric machine 2.

Provided on the non-driving side NS is a fan housing 15 which has an axial end surface formed with a plurality of vent openings 14 and is secured to the sides of the housing 8. The fan housing 15 accommodates a fan wheel 16 which is mounted on the rotor shaft 9 and operates like a ventilator to produce an axial air stream for flow in a direction indicated by arrow 17 along the outer side of the housing 8. The housing 8 is suitably formed with longitudinal fins 18 for enlarging the heat-exchange surface of the housing 8. As an alternative to this type of exterior ventilation, it is of course also possible to use a different type of cooling such as, e.g., an auxiliary ventilation.

The cooling system shown in FIG. 1 is provided in addition to the external ventilation of the housing 8 through the axial air flow in the direction of arrow 17 with a closed-flow system for providing a cooling action in at least one of the inner housing spaces 19a, 19b at the axial ends of the housing 8. The closed-flow system includes a stationary closed tube assembly, generally designated by reference numeral 20, which is constructed for circulation of a coolant by thermosiphon. The thermosiphon 20 includes at least one condenser 21 in a condensation zone, an evaporator 22 in an evaporation zone, and tubes 23, 24 which extend between the condenser 21 and the evaporator 22. The tubes 23, 24 project through the housing wall and may be constructed flexible to ensure a positional independence as the motor is assembled. The required cooling capacity is provided by the condenser 21 which may be configured in the form of a cooling coil and exposed, for example, to a cooling air flow of cooling air as indicated by arrows 26. Generation of this cooling air flow may be realized by a fan. Of course, it is equally possible to use a different type of coolant, such as water, in which case the condenser is part of a water-based heat exchanger, as provided for example for ship's propulsion drives.

Coolant condenses in the cooling coils of the condenser 21 and as a result of a geodetic gradient between the condenser 21 and the evaporator 22 flows in liquid state, labeled $k_f$, via the tube 23 to the evaporator 22. The liquid coolant $k_f$ at least partly evaporates there by absorbing heat in the evaporation zone and is converted into a gaseous state, labeled $k_g$. The gaseous coolant $k_g$ leaves the evaporator 22 via the tube 24 and flows back to the condenser 21 where the gaseous coolant $k_g$ reliquefies in the cooling coils. This type of natural circulation involving boiling and evaporation establishes the thermosiphon effect.

Any coolant known to the artisan in the field of cooling technology can be used. Depending on the demand on the temperature level, liquefiable gases such as propane, butane, acetone or neon or azeotropic mixtures used in standard cooling technology are applicable.

As shown in FIG. 1, the evaporator 22 has a ring-shaped configuration in surrounding relationship to the rotor shaft 9 and is disposed in the inner housing space 19a of the housing 8 anteriorly of the rotor core 3 near the end winding 6a, 6a' of the stator winding. The evaporator 22 is thus able to absorb heat generated by the rotor and the stator. The amount of heat given off by the end winding 6a, 6a' is indicated in FIG. 1 by arrows q. As heat is transferred indirectly by forced convection to the evaporator 22, the provision of a blade wheel 28a, as known, for example, in the field of turbo generators, is suitable for improving the heat transfer. The blade wheel 28a is mounted to an end surface of the rotor core 3 and thus rotates conjointly with the rotor. As a result of the arrangement of the blade wheel 28a, air in the inner housing space 19a swirls around. At the same time, the evaporator 22 shields the bearing 10a against incident heat.

Arranged on the non-driving side NS is also a thermosiphon in the form of a closed tube assembly, generally designated by reference numeral 30. The thermosiphon 30 includes a helical condenser 31, which is disposed in an air flow of the fan wheel 16 inside the fan housing 15, and an evaporator 32 in the inner housing space 19b of the housing 8 for cooling the end windings 6b, 6b' in particular. A blade wheel 28b is mounted to an adjacent end surface of the rotor core 3 and thus rotates conjointly with the rotor for swirling air in the inner housing space 19b.

Figure 2:
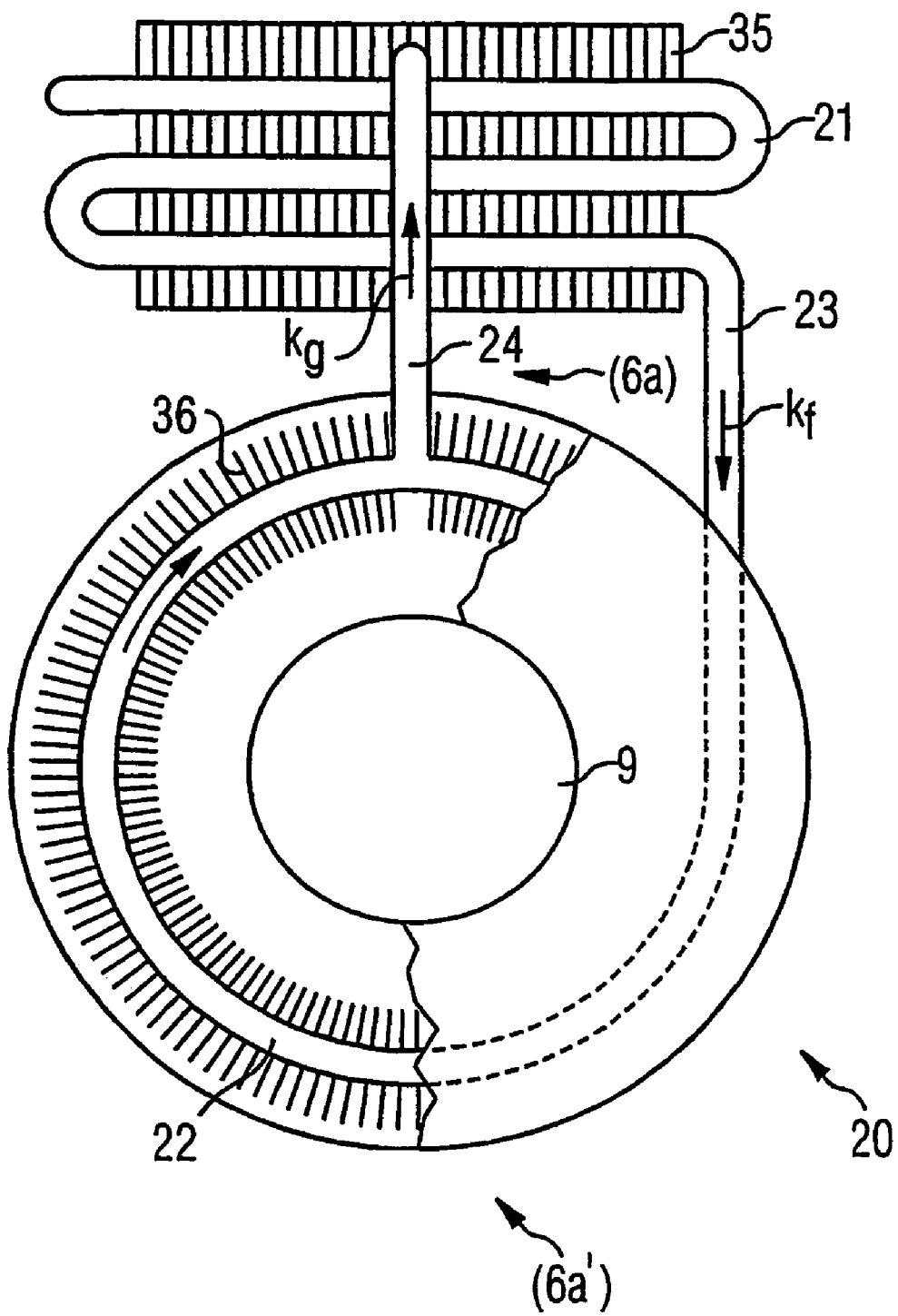
FIG. 2 is an enlarged detailed view of a thermosiphon-type circuit system used in the electric machine of FIG. 1.

Turning now to FIG. 2, there is shown an enlarged detailed view of the thermosiphon 20 used in the electric machine 2. As can be seen from FIG. 2, the condenser 21 as well as the evaporator 22 may be provided with surface-enlarging structures to expand the area of heat transfer. As an example, the condenser 21 may be configured with a fin assembly 35 having cooling fins. Likewise, the evaporator 22 may be made of a finned tube with fins 36.

Figure 3:
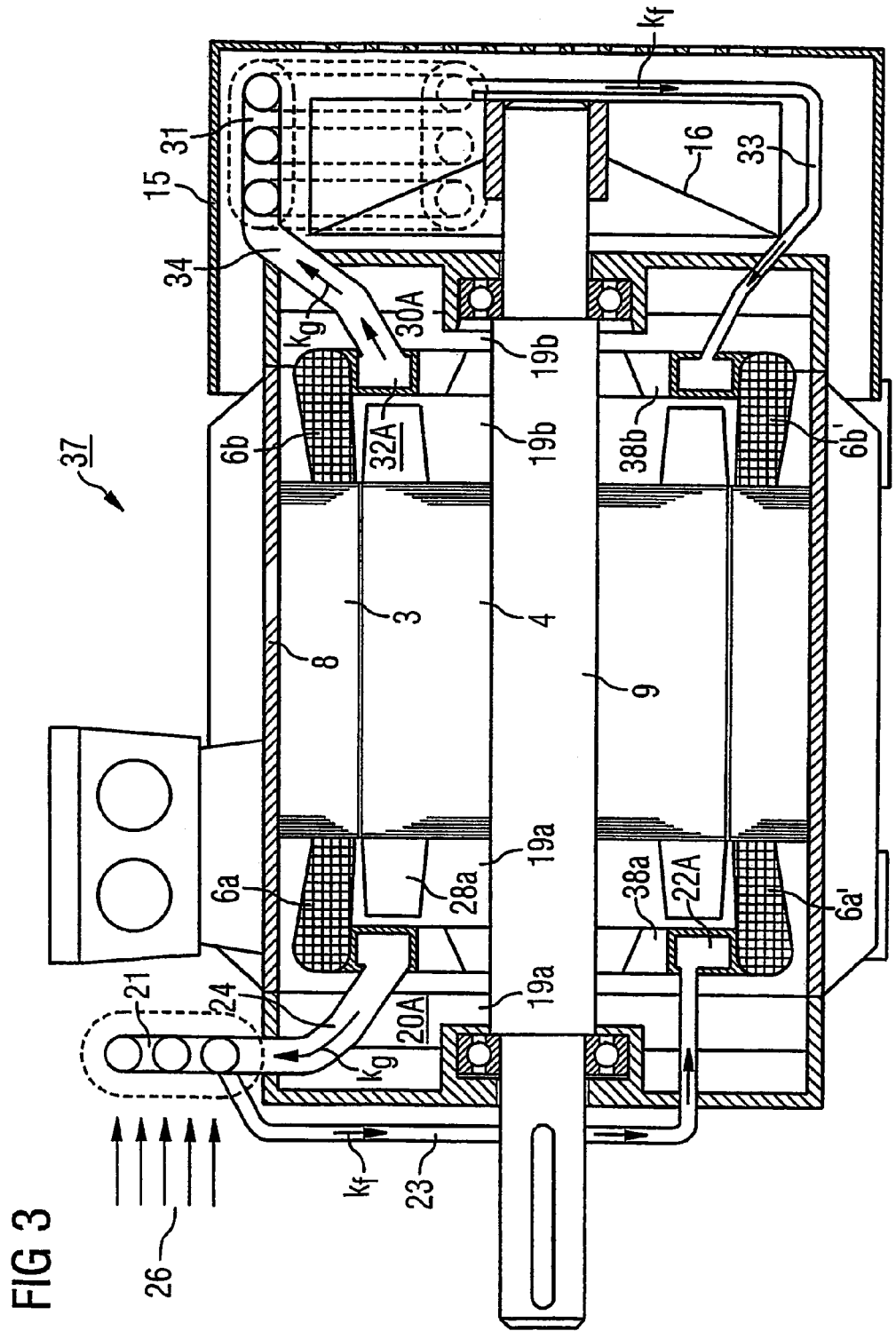
FIG. 3 is a sectional view of a second embodiment of an electric machine according to the present invention.

In the non-limiting example of FIG. 1, the at least one evaporator 22 is situated in the inner housing space 19a and absorbs heat from heat-generating sources such as end winding 6a, 6a' and other components such as rotor core 3, using air in the inner housing space 19a. Of course, a direct thermal connection between an evaporator and a component to be cooled is conceivable as well. Such an embodiment of an electric machine is shown in FIG. 3 and generally designated by reference numeral 37. In the following description, parts corresponding with those in FIG. 1 will be identified, where appropriate for the understanding of the invention, by corresponding reference numerals followed by an "A". The description below will center on the differences between the embodiments. In this embodiment, provision is made for a separate thermosiphon system for the end windings 6a, 6a' and 6b, 6b'. The electric machine 37 thus has a thermosiphon 20A at one axial end thereof and a thermosiphon 30A at the other axial end. The thermosiphon 20A includes an evaporator 22A which rests against the end winding 6a, 6a' so as to be able to directly absorb heat amounts given off by the end winding 6a, 6a' via this direct heat-conducting connection. Likewise, the thermosiphon 30A includes an evaporator 32A which rests against the end winding 6b, 6b' so as to be able to directly absorb heat amounts given off by the end winding 6b, 6b' via this direct heat-conducting connection. Both evaporators 22A, 32A may hereby additionally be provided with cooling fins 38a, 38, respectively to improve the heat absorption from the respective inner housing spaces 19a, 19b.

Figure 4:
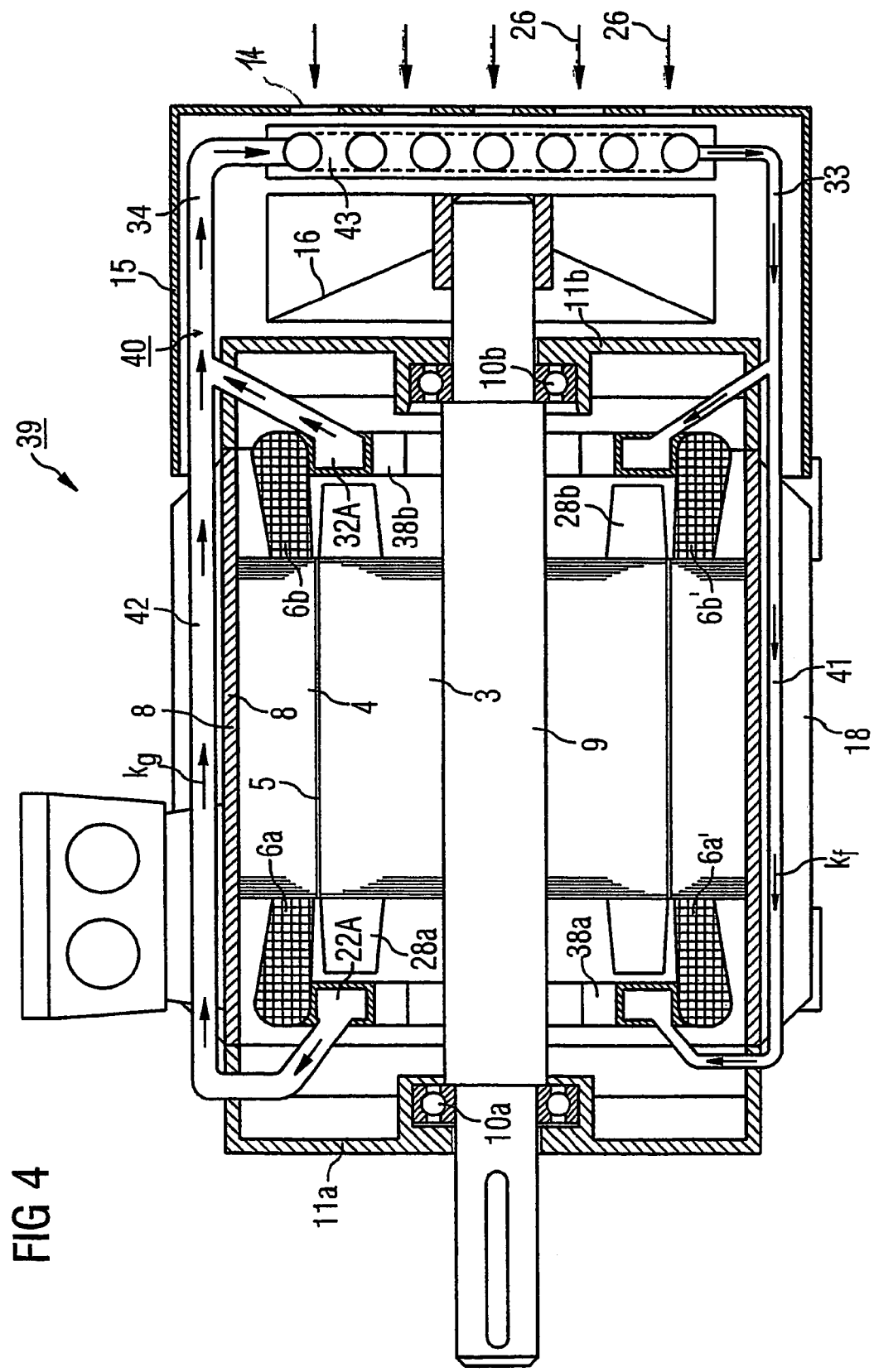
FIG. 4 is a sectional view of a third embodiment of an electric machine according to the present invention.

Turning now to FIG. 4, there is shown a sectional view of a third embodiment of an electric machine according to the present invention, generally designated by reference numeral 39. Parts corresponding with those in FIG. 3 are denoted by identical reference numerals and not explained again. The description below will center on the differences between the embodiments In this embodiment, provision is made for a common thermosiphon-type closed-flow system, generally designated by reference numeral 40. The thermosiphon 40 includes a single condenser 43, disposed anteriorly of the fan wheel 16, and two evaporators 22A, 32A respectively arranged at the axial ends of the electric machine 39 for absorbing heat generated by the end windings 6a, 6a' and 6b, 6b'. The evaporators 22A, 32A are interconnected by a lower collecting conduit 41 for conducting condensed coolant $k_f$, and an upper collecting conduit 42 for conducting evaporated coolant $k_g$. In other words, the collecting conduit 42 is disposed at a geodetically higher level than the collecting conduit 41. The collecting conduit 41 is routed to the lower parts of the evaporators 22A, 32A in the area of the end winding components 6a' and 6b', whereas the collecting conduit 42 conducts coolant away from the area of the upper end windings components 6a, 6b. The collecting conduits 41, 42 extend along the housing 8, e.g. in a fin channel, whereby the collecting conduit 41 has a cross section which is smaller than the cross section of the collecting conduit 42. Tube 33 connects hereby the collecting conduit 41 to the condenser 43, while a tube 34 connects the collecting conduit 42 to the condenser 43.

As a consequence of its disposition anteriorly of the fan wheel 16, the condenser 43 can be integrated in the extended ventilation or fan housing 15 for protection against external mechanic damages. Cooling air may be pressed through the vent openings 14, as indicated by arrows 26, to the area of the condenser 43, if placed anteriorly of the fan wheel 16, or may also be conducted to apply a suction effect.

The disposition of the condenser 4 is shown in FIG. 4 by way of example only. It is, of course, also conceivable to arrange the condenser outside the housing 8, resembling a disposition of the condenser 21 shown in FIGS. 1 to 3. The condenser 43 may have a helical configuration about a horizontal axis, resembling a disposition of the condenser 31 shown in FIGS. 1 and 3. Even a disposition on the outside in front of or on one of the end plates 11a, 11b in an air flow may be possible. Of course, any combination of afore-described dispositions of several condensers may be provided for a thermosiphon system.

Figure 5:
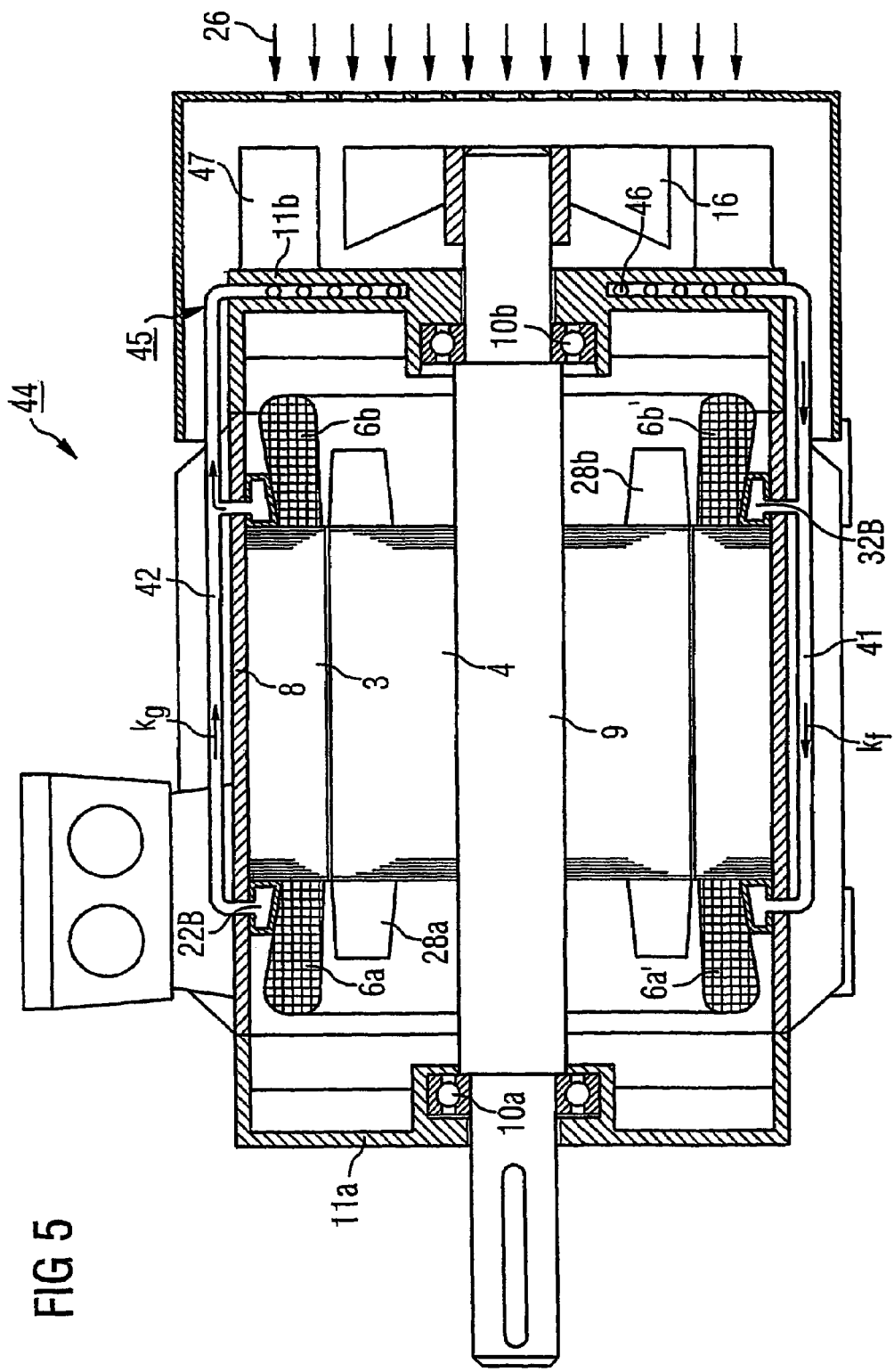
FIG. 5 is a sectional view of a fourth embodiment of an electric machine according to the present invention.

Turning now to FIG. 5, there is shown a sectional view of a fourth embodiment of an electric machine according to the present invention, generally designated by reference numeral 44. Parts corresponding with those in FIG. 4 are denoted by identical reference numerals and not explained again. The description below will center on the differences between the embodiments. The electric machine 44 has a thermosiphon-type closed-flow system 45 with collecting conduit 41 for liquid coolant $k_f$ and collecting conduit 41 for gaseous coolant $k_g$. The collecting conduits 41, 42 are connected to evaporators 22B, 32B which are respectively disposed on the radial outer sides of the end windings 6a, 6a' and 6b, 6b' in heat-conducting connection therewith. The thermosiphon 45 includes a condenser 46 on the end surface of the housing 8 at the non-driving side NS of the electric machine 44. For example, the condenser 46 may be directly mounted to or integrated in the end plate 11b. To improve the heat exchange, the condenser 46 is provided with axis-parallel cooling fins 47 which extend in the air flow 26 of the fan wheel 16 within the fan housing 15.

In the electric machine 44 of FIG. 5, the evaporators 22B, 32B are thus respectively arranged in intermediate spaces between the end windings 6a, 6a' and 6b, 6b' and the housing 8.

Turning now to FIG. 6, there is shown a sectional view of a fifth embodiment of an electric machine according to the present invention, generally designated by reference numeral 49. Parts corresponding with those in FIG. 1 are denoted by identical reference numerals and not explained again. The description below will center on the differences between the embodiments. The electric machine 49 has a thermosiphon 53 in the inner housing space 19a and a thermosiphon 54 in the inner housing space 19b. The thermosiphon 53 has an evaporator 51 which is directly integrated in or in heat-conducting connection with the end plate 11a, whereas the thermosiphon 54 has an evaporator 52 which is directly integrated in or in heat-conducting connection with the end plate 11b. As heat is here directly absorbed and removed by the thermosiphon 53 and thermosiphon 54 across the comparably large areas of the end plates 11a, 11b, respectively, the bearings 10a, 10b are not exposed to a risk of overheating.

As noted above, any of the evaporators described herein may be provided with surface-enlarging structures, such as cooling fins, to improve heat exchange. These surface-enlarging structures may also be configured to improve heat absorption in the area of the rotor shaft 9, as will now be described in connection with FIG. 7 which shows a cutaway view, on an enlarged scale, of a modification of the electric machine 39 of FIG. 4 in relation to the driving side AS. Persons skilled in the art will understand that the improvement in heat exchange can certainly also be duplicated on the opposite non-driving side NS of the electric machine 39. Parts corresponding with those in FIG. 4 are denoted by identical reference numerals and not explained again. The description below will center on the differences between the embodiments. The electric machine 39 has a thermosiphon 40 as shown in FIG. 4, whereby the evaporator 22A and the rotor shaft 9 have attached thereon substantially disk-shaped heat-conducting members 56, 57, respectively. The heat-conducting members 56 on the evaporator 22A have axial tubular or annular projections 56a, which mesh without contact axial tubular or annular projections 57a of the heat-conducting members 57 on the rotor shaft 9. As a consequence of this configuration, the heat-exchange surface of the evaporator 22A is enlarged but the heat-conducting members 56, 57 effect also a thermal linkage from the end winding 6a, 6a' to the rotor shaft 9 and thus to all components in thermal connection with the rotor shaft 9, such as rotor winding or rotor core 4. In other words, the thermal resistance and the temperature differential between the rotor shaft 9 and the respective end winding can thus be reduced.

While the invention has been illustrated and described in connection with currently preferred embodiments shown and described in detail, it is not intended to be limited to the details shown since various modifications and structural changes may be made without departing in any way from the spirit of the present invention. For example, an electric machine according to the present invention may be provided with additional rotor cooling channels, as described in afore-mentioned German patent publication no. DE 42 42 132 A1. The embodiments were chosen and described in order to best explain the principles of the invention and practical application to thereby enable a person skilled in the art to best utilize the invention and various embodiments with various modifications as are suited to the particular use contemplated.

What is claimed is:

1. An electric machine, comprising:
   a housing;
   a rotatably supported rotor and a stationary stator which are received in the housing and interact with one another, wherein the stator has axial ends and has a stator winding which terminates in winding end parts at the axial ends of the stator; and
   a cooling device for cooling heat-generating components of the rotor and the stator, said cooling device including a closed-flow system having
      an evaporator disposed in the housing in close proximity of a one of the axial winding end parts of the stator winding,
      a condenser disposed outside the housing at a geodetically higher location, and
      a closed tube assembly, which connects the condenser and the evaporator, for circulating a coolant using a thermosiphon effect as a result of a difference in density between vapor and liquid portions of the coolant, with the closed-flow system containing a liquid-vapor mixture of the coolant in saturated state, said tube assembly including a first tube for feeding coolant to the evaporator and a second tube for conducting coolant away from the evaporator, wherein the first tube has a cross section which is smaller than a cross section of the second tube.

2. The electric machine of claim 1, wherein the housing has opposite end surfaces, wherein the closed-flow system is disposed at one of the end surfaces, said cooling device including a second said closed-flow system disposed at the other one of the end surfaces.

3. The electric machine of claim 1, wherein the housing has opposite end surfaces, said closed-flow system having two evaporators, with one of the evaporators disposed at one of the end surfaces, and the other one of the evaporators disposed at the other one of the end surfaces.

4. The electric machine of claim 1, wherein at least one member selected from the group consisting of the evaporator and the condenser is constructed with a surface-enlarging structure for increasing a heat transfer.

5. The electric machine of claim 4, wherein the condenser is constructed as a cooling coil.

6. The electric machine of claim 4, wherein the condenser is constructed with cooling fins.

7. The electric machine of claim 4, wherein the condenser is constructed in the form of a cooling coil with cooling fins.

8. The electric machine of claim 4, wherein the evaporator is constructed with cooling fins.

9. The electric machine of claim 1, wherein the evaporator is constructed in heat-conducting connection with at least one of the axial winding end parts.

10. The electric machine of claim 1, wherein the housing has opposite end plates, said evaporator being constructed for heat-conducting connection with at least one of the end plates.

11. The electric machine of claim 10, wherein the evaporator is integrated in the one end plate.

12. The electric machine of claim 1, wherein the cooling device is constructed to have an additional flow path system for air cooling.

13. The electric machine of claim 12, wherein the flow path system includes a fan disposed on one end of the housing for generating an air stream in a flow channel at an outer marginal area of the housing.

14. The electric machine of claim 13, wherein the condenser is disposed in the air stream.

15. The electric machine of claim 1, wherein the rotor has a rotor shaft having substantially disk-shaped heat-conducting members which are formed with axial projections, said evaporator having substantially disk-shaped heat-conducting members which are formed with axial projections for meshing without contact with the projections of the heat-conducting members on the rotor shaft.

* * * * *